United States Patent Office 3,451,961
Patented June 24, 1969

3,451,961
VINYL RESIN COMPOSITIONS
Dale Robert Dill, Webster Groves, Mo., assignor to Monsanto Company, St. Louis, Mo., a corporation of Delaware
No Drawing. Continuation-in-part of application Ser. No. 422,517, Dec. 31, 1964. This application June 14, 1967, Ser. No. 645,899
Int. Cl. C08f *45/36;* C08g *51/38*
U.S. Cl. 260—31.8                                                8 Claims

ABSTRACT OF THE DISCLOSURE

This invention relates to the use of a plasticizer comprising 7-(2,6,6,8 - tetramethyl - 4 - oxa - 3 - nonyl)benzyl phthalate in vinyl floor compositions.

---

This application is a continuation in part of pending application Ser. No. 422,517, filed Dec. 31, 1964, now abandoned.

This invention relates to new and useful vinyl resin compositions. In particular, this invention relates to new compositions containing a polymerized vinyl chloride and certain plasticizers therefor.

Hard surface floor coverings are more widely used today than ever before. In particular, plastic floor coverings containing a thermoplastic resin as a binder instead of linoleum cement are finding more and more applications throughout the country. Wider use of plastic floor covering has made it possible to produce the floor covering in a great variety of colors and patterns, many of which are pastel shades or of other light colors; even white floorings, or floorings containing a great deal of white, are in use.

Use of these light-colored plastic floorings has produced an unexpected problem throughout the industry. Those parts of light-colored plastic floorings subjected to heavy traffic have developed undue brownish or yellowish stains. This phenomenon, known as traffic staining, now constitutes one of the major problems in the use of light-colored plastic floorings in heavy traffic areas. The industry has devoted much research time and effort in an attempt to solve this problem, but no satisfactory solution has been found as yet. It has been learned that the traffic staining problem appears to be related to the plasticizer used with the polymerized vinyl chloride binder in the flooring but, to date, efforts to find a suitable plasticizer which will eliminate or minimize traffic staining have been unavailing.

It is a primary object of the present invention to supply plasticized polymerized vinyl chloride resin compositions suitable for use in a plastic floor binder, which will reduce or eliminate the traffic staining phenomena. A further object is to present a plastic floor covering binder having increased strength when used in a floor covering, while at the same time minimizing traffic staining. A still further object of this invention is to present a plasticizer composition which, when incorporated in vinyl chloride resins, imparts the aforedescribed improved properties.

Other objects and advantages of the invention will be apparent to those skilled in the art from the following detailed description and claims.

In accordance with this invention, it has been found that the above and still further objects are achieved by incorporating in the polyvinyl chloride or polyvinyl acetate-chloride resins of a floor tile composition a plasticizer comprising 7-(2,6,6,8 - tetramethyl - 4 - oxa-3-oxo-nonyl) benzyl phthalate.

Generally speaking, about 5 to about 100 parts by weight of plasticizer can be used for each 100 parts by weight of vinyl resin. However, it is preferred to use from about 20 to about 80 parts by weight of a plasticizer per 100 parts by weight of resin.

7 - (2,6,6,8-tetramethyl-4-oxa-3-nonyl)benzyl phthalate can be readily prepared by reacting phthalic anhydride with 2,6,6,8-tetramethyl-4-oxa-3-oxo-nonan-7-ol to produce a half ester, and thereafter reacting the half ester with a tertiary aliphatic amine and a benzyl halide. The following example serves to further illustrate the preparation of 7-(2,6,6,8-tetramethyl-4-oxa-3-oxo-nonyl)benzyl phthalate. Such example is given for the purpose of illustration only, and is not to be construed as limiting the scope of this invention in any way.

EXAMPLE I

To a suitable reaction vessel having means for the addition and removal of heat, means for measuring the temperature of the reaction mass, means for agitating the reaction mass, means for the addition and removal of solids and liquids, and fitted with a condenser, there are charged 296.2 grams (2.0 mols.) of phthalic anhydride and 436.9 grams (2.02 mols.) of 2,6,6,8-tetramethyl-4-oxa-3-oxo-nonan-7-ol. The mixture is heated to about 124° C., and 212.5 grams (2.10 mols.) of triethylamine are added. There is then added 272.15 grams (2.15 mols.) of benzyl chloride. The resultant mixture is held at a temperature of about 138° C. for about one hour and then washed with several water and lye washes. The oil layer from the washing step is steam sparged and dehydrated at 125–130° C. at 60–70 mm. Hg. There is obtained 860.8 grams (94.7% of theory) of 7-(2,6,6,8-tetramethyl-4-oxa-3-oxo-nonyl)benzyl phthalate.

The polymerized vinyl chloride resins to be used in the compositions of the present invention may be those low to medium molecular weight resins available in commerce. Illustratiive of such resins are the vinly chloride-vinyl acetate copolymers containing about 3% to 5% vinyl acetate, made by the Bakelite Company and bearing the designations "VYMF" and "VYVF." The copolymers containing about 13% vinyl acetate, such as those designated "VYNW" and "VYHH," are also suitable. Straight polyvinyl chloride resins, such as those designated as GEON and OPALON resins, particularly "GEON 121," "GEON 126" and "OPALON 630," are suitable. Other vinyl chloride resins found to be suitable include those designated as "QYNW," "EXON 666," "OPALON 410" and "OPALON 440." Mixtures of one of the homopolymers and a copolymer will frequently be used. The most significant property of the polymerized vinyl chloride resin suitable for use in the compositions of the present invention is that of yield of a hard, tough and otherwise desirable surface covering material after being plasticized and admixed with suitable fillers and other ingredients.

Generally speaking, it is contemplated that the composition to be used as a binder will comprise about 50% to about 25% by weight of the wearing surface composition of the floor covering. The binder is admixed with filler, including pigment, in such proportions that the filler comprises about 50% to about 75% by weight of the compositions. When the filler content is below about 50%, pattern content may be difficult. When more than about 75% by weight of filler is present, the physical properties of the finished surface covering materials do not measure up to the desired standards in floor covering art. The filler material may be organic or inorganic, or mixtures thereof. The filler often contains a preponderant proportion by volume of fibrous filler, such as wood flour, cork particles, asbestos, other mineral fibers and the like. The remainder of the filler component is comprised of finely divided particles such as whiting, clay, silica, slate flour and similar non-fibrous filler material. If the flooring is destined to be installed below grade, then it is preferred that the filler system consist of inorganic fillers, either fibrous, non-fibrous or both. Such a filler system is insensitive to the alkaline moisture conditions encountered on below-grade or no-brade installations. Also included in the filler component are small but effective amounts of lubricants and detachifying agents, such as stearic acid, paraffin wax, ceresin wax, oleic acid and lauric acid. Snythetic rubber, such as the butadiene styrene copolymers or the butadiene acrylonitrile copolymers, may be added. The addition of these rubbers renders the composition sulfur-curable, whereby vulcanizing agents and the curing accelerators may then be added to the filled composition. Thus, there may be added sulfur, or sulfur-containing compounds, along with various vulcanization accelerators, as, for example, zinc phenyl ethyl dithiocarbamate, diethyl dithiocarbamate, zinc isopropyl dithiocarbamate, zinc diethyl dithiocarbamate, diphenyl guanadine, tetraethyl thiuram disulfide and tetramethyl thiuram disulfide. Stabilizers or antioxidants such as hydroquinone, N-phenyl α-naphthylamine, N-phenyl β-naphthylamine, N,N′-exomethylene-bis(orthohydroxy benzamide), sodium acid phosphate, dibutyl tin dilaurate and others known in the art, may be used. The total amount of the compounding agents, exclusive of the fibrous and non-fibrous filler, generally run up to about 10% by weight of the filler.

Conventional prior art plasticizing agents and mixtures thereof can be incorporated into the present compositions. Such compounds include: Phthalate esters such as dimethyl phthalate, diethyl phthalate, dibutyl phthalate, diisobutyl phthalate, butyl octyl phthalate, dihexyl phthalate, dioctyl phthalate, di(2-ethylhexyl) phthalate, octyl decyl phthalate, diisodecyl phthalate, ditridecyl phthalate, butyl cyclohexyl phthalate, butyl benzyl phthalate, di(Cellosolve) phthalate, di(butyl Cellosolve) phthalate, monobutyl phthalyl butyl glycolate ester, monoethyl phthalyl ethyl glycolate ester and the like; phosphate esters such as cresyl diphenyl phosphate, phenyl dicresyl phosphate, tricresyl phosphate; the liquid alkyl diaryl phosphates wherein the alkyl group contains from 6 to 14 carbon atoms and the aryl groups are phenyl or cresyl or mixtuers thereof, e.g., octyl diphenyl 2-ethylhexyl dicresyl phosphates; the dialkyl aryl phosphates such as 2-ethylhexyl butyl phenyl, decyl isoamyl cresyl phosphates, etc., the liquid esters of dicarboxylic acid such as dibutyl sebacate, dihexyl adipate, di(butyl Cellosolve) adipate, and the like; epoxidized vegetable oils such as epoxidized soya oils; glycol benzoates such as diethylene glycol dibenzoate, dipropylene glycol dibenzoate, triethylene glycol dibenzoate, pentaerythritol tetrabenzoate, 3-methyl-1, 5-pentanediol dibenzoate and 2-ethylhexyl-p-oxybenzoate; hydrocarbons, for example, polyphenyls such as o-terphenyl, p-terphenyl, m-terphenyl and mixtures thereof, and partially hydrogenated terphenyl; chlorinated polyphenyls such as chlorinated o-terphenyl, p-terphenyl, m-terphenyl and mixtures thereof and chlorinated biphenyl; alkylated polyphenyls such as isopropyl biphenyl, diisopropyl biphenyl and isopropyl terphenyl; alkyl aryl hydrocarbons such as triethyl benzene, tetraethyl benzene, hexaethyl benzene, diisopropylbenzene, triisopropyl benzene, di-n-propyl benzene, di-n-butyl benzene and partially hydrogenated alkyl aryl hydrocarbon (partially hydrogenated terphenyl and the partially hydrogenated alkyl aryl hydrocarbon are marketed as HB-40 and HB-20 respectively by Monsanto Chemical Co.); aryl alkanes such as monophenyl decane, monophenyl dodecane, monophenyl pentadecane and monophenyl octadecane and the like and mixtures thereof; chlorinated aryl alkanes; and chlorinated paraffin hydrocarbons of the composition in the range of $C_{18}H_{38}$ to $C_{30}H_{62}$. In such compositions wherein conventional prior art plasticizers are incorporated, there is employed from about 0.3 part to about 10 parts by weight of 7-(2,6,6,8-tetramethyl-4-oxa-3-oxo-nonyl) benzyl phthalate per part by weight of the complementary plasticizer or mixtures thereof.

In order to demonstrate some of the desirable and unexpected properties displayed by the plasticizer composition of this invention, a number of resinous compositions were prepared and subjected to various test procedures.

In a first series of tests, a polyvinyl chloride resin was mixed with several plasticizers shown in Table I wherein all parts are parts by weight. Samples containing a 40% concentration of plasticizer were then checked for low temperature flexibility, volatility, hardness, water absorption and kerosene extraction in accordance with A.S.T.M. procedures. Results of these tests are summarized in Table II.

| | Parts |
|---|---|
| Polyvinyl chloride | 100 |
| Plasticizer | (¹) |
| Limestone | 180 |
| Titanium dioxide | 15 |
| Barium-cadmium stabilizer | 2.5 |
| Paraffin wax | 0.5 |
| Stearic acid | 0.5 |
| Epoxidized soybean oil | 1.0 |

¹ Choice and concentration as given in accompanying tables. All figures are parts by weight.

After the usual mixing and sheet-forming operations, test installations were made wherein white floor coverings

TABLE I.—PLASTICIZER COMPOSITION

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Butyl benzyl phthalate | 100 | | | | | 25 | 50 | 33 | | | | | | 80 | | | |
| Di-2-ethyl hexyl phthalate | | 100 | | | | | | | | | | 80 | | | | | |
| Butyl octyl phthalate | | | 100 | | | | | | | | | | | | | | |
| 7-(2,6,6,8-tetramethyl-4-oxa-3-oxo-nonyl) benzyl phthalate | | | | 100 | 75 | 50 | 67 | 90 | 90 | 50 | 95 | | | 80 | 80 | 80 | 80 |
| Dimethyl phthalate | | | | | | | | | 10 | | | 20 | | | | | |
| HB-40 ¹ | | | | | | | | | | 10 | | | 20 | 20 | | | 20 |
| Ditridecyl phthalate | | | | | | | | | | | | | 50 | | | | |
| Diethyl phthalate | | | | | | | | | | | 5 | | | | | 20 | |
| Diisobutyl phthalate | | | | | | | | | | | | | | | 20 | | |

¹ Partially-hydrogenated terphenyl.

TABLE II

| Plasticizer | T. f, °C. | Volatility, Percent Plas. Loss | Hardness Shore A | | Water Absorption | | Kerosene Ext., Percent Plas. Loss |
|---|---|---|---|---|---|---|---|
| | | | Before Vol. | After Vol. | Percent Plas. Loss | Percent Abs. | |
| 1 | −23.2 | 8.0 | 65 | 67 | 0.06 | 0.30 | 2.5 |
| 2 | −40.4 | 4.8 | 66 | 67 | 0.01 | 0.18 | 39.3 |
| 3 | −38.6 | 9.6 | 68 | 67 | 0.05 | 0.29 | 35.7 |
| 4 | +2.9 | 0.7 | 80 | 81 | 0.00 | 0.34 | 0.2 |
| 6 | −12.8 | 4.8 | 68 | 70 | 0.05 | 0.34 | 1.4 |
| 7 | −9.1 | 3.9 | 69 | 71 | 0.06 | 0.35 | 1.2 | in the form of sheets having the above formulation were installed in heavy traffic areas. After three months of use, the flooring was inspected for staining. The compositions containing plasticizers 1 and 2 were appreciably darker and carried a more heavy, yellow, permanent traffic stain than the composition containing plasticizers 4, 5, 6 and 7.

In order to assess quantitative values, additional stain tests were made with compositions containing various plasticizers selected from plasticizers 1 through 17 of Table I. A 0.5% Du Pont oil-soluble yellow dye dissolved in kerosene was used as the stainant in the examples shown in Table III. The stainant remained in contact with the plasticized vinyl tile samples for thirty minutes. In Test A, the intensity of stain was measured on a G.E. recording spectrophotometer, Model 7015E 30 G62. This instrument determined the tristimulus values (XYZ) for which dominant wave lengths and the excitation purity of the hue of color are calculated in accordance with ICI (International Committee of Illumination) method. The excitation purity value is used to compare one tile with another tile, wherein 0% purity equals pure white light and 100% purity equals a pure spectral color, such as yellow. The lower purity value indicates a greater stain resistance. PHR represents the parts of plasticizer used per 100 parts of resin.

The visual rating obtained in Test B employed a scale of 0 to 10. The value of 10 was given to the composition containing diisodecyl phthalate which showed the least stain resistance. Lower numbers show greater stain resistance, a value of 0 being an indication of no staining. PHR represents the parts of plasticizer used per 100 parts of resin.

TABLE III

| Plasticizer | Phr. | Test A, Percent Purity | Test B, Visual Rating |
|---|---|---|---|
| 2 | 18 | 51.9 | 4 |
| 1 | 24 | 35.9 | 7 |
| 4 | 24 | 28.4 | 3 |
| 5 | 24 | 26.3 | 3 |
| 14 | 24 | | 3 |
| 1 | 67 | 75.5 | 8 |
| 8 | 67 | 10.8 | 3 |
| 9 | 67 | 33.4 | |
| 12 | 67 | 83.2 | |
| 13 | 67 | 70.9 | |
| 14 | 67 | 38.7 | |
| 15 | 67 | 27.3 | |
| 16 | 67 | 31.8 | |
| 17 | 67 | 38.4 | |

The foregoing table demonstrate the remarkable stain resistance effect which can be obtained using 7-(2,6,6,8-tetramethyl-4-oxa-3-oxo-nonyl) benzyl phthalate alone and in combination with conventional vinyl resin plasticizers in floor tile formulations.

While this invention has been described with respect to certain specific embodiments, it is not so limited. It is to be understood that variations and modifications thereof may be made without departing from the spirit and scope of the invention.

The embodiments of the invention in which an exclusive property or privilege is claimed are defined as follows:

1. A composition of matter comprising a polymerized vinyl chloride resin selected from the group consisting of polyvinyl chloride, vinyl chloride-vinyl acetate copolymers, and mixtures thereof, and from about 5 to about 100 parts by weight per 100 parts by weight of resin of a plasticizer consisting essentially of 7-(2,6,6,8-tetramethyl-4-oxa-3-oxo-nonyl) benzyl phthalate.

2. A composition as defined in claim 1 wherein said resin is polyvinyl chloride.

3. A composition as defined in claim 1 wherein from about 20 to about 80 parts by weight of a plasticizer consisting essentially of 7-(2,6,6,8-tetramethyl-4-oxa-3-oxo-nonyl) benzyl phthalate are employed per 100 parts by weight of resin.

4. A composition of matter comprising polyvinyl chloride and from about 20 to about 80 parts by weight per 100 parts by weight of polyvinyl chloride of a mixture of 7-(2,6,6,8-tetramethyl-4-oxa-3-oxo-nonyl) benzyl phthalate and butyl benzyl phthalate, from about 0.3 part to about 10 parts of the former being employed per part of the latter.

5. A composition as defined in claim 4 wherein about one part of 7-(2,6,6,8-tetramethyl-4-oxa-3-oxo-nonyl) benzyl phthalate is employed per part of butyl benzyl phthalate.

6. A composition as defined in claim 4 wherein about 3 parts of 7-(2,6,6,8-tetramethyl-4-oxa-3-oxo-nonyl) benzyl phthalate are employed per part of butyl benzyl phthalate.

7. A composition of matter comprising polyvinyl chloride and from about 20 to about 80 parts by weight per 100 parts by weight of polyvinyl chloride of a mixture of 7-(2,6,6,8-tetramethyl-4-oxa-3-oxo-nonyl) benzyl phthalate and dimethyl phthalate, from about 4 parts of the former being employed per part of the latter.

8. A composition of matter comprising polyvinyl chloride and from about 20 to about 80 parts by weight per 100 parts by weight of polyvinyl chloride of a mixture of 7-(2,6,6,8-tetramethyl-4-oxa-3-oxo-nonyl) benzyl phthalate and diisobutyl phthalate, from about 4 parts of the former being employed per part of the latter.

References Cited

UNITED STATES PATENTS

| 3,090,763 | 5/1963 | Hillier | 260—31.8 |
| 3,152,096 | 10/1964 | Darby | 260—30.4 |
| 3,160,599 | 12/1964 | Scullin | 260—31.6 |
| 3,211,561 | 10/1965 | Gearhart et al. | 260—31.6 |
| 3,211,689 | 10/1965 | Darby | 260—31.4 |
| 3,318,835 | 5/1967 | Hagemeyer et al. | 260—31.6 |

FOREIGN PATENTS 629,888   10/1963   Belgium.

MORRIS LIEBMAN, *Primary Examiner.*

HENRY S. KAPLAN, *Assistant Examiner.*

U.S. Cl. X.R.

260—32.2